March 18, 1930.　　F. A. TAYLOR ET AL　　1,751,370
TEMPERATURE REGULATING APPARATUS
Filed March 25, 1929　　2 Sheets-Sheet 1
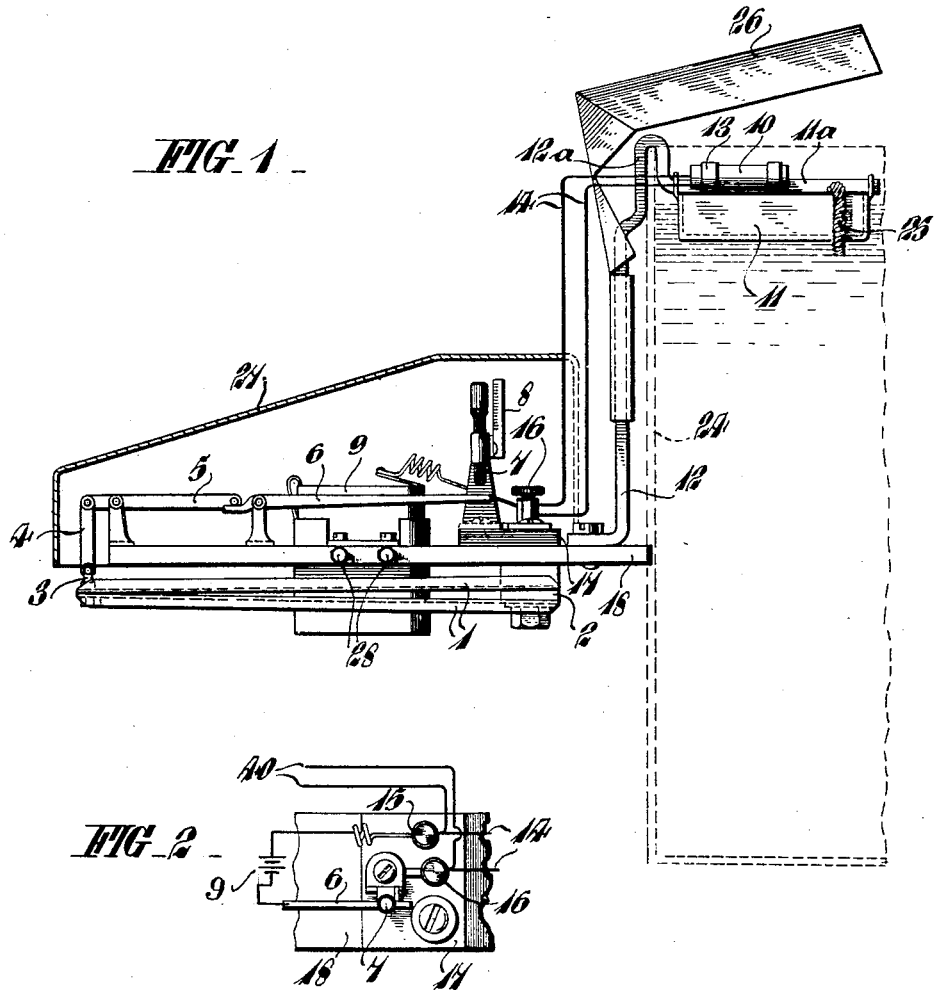
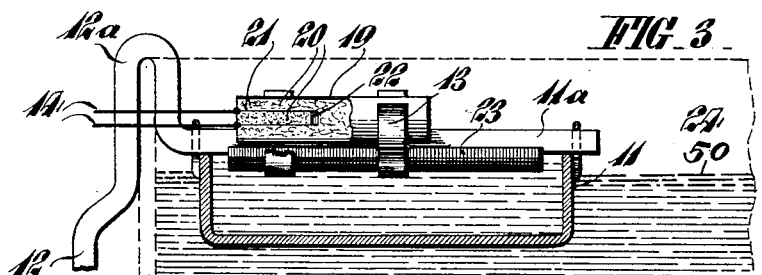

Patented Mar. 18, 1930

1,751,370

UNITED STATES PATENT OFFICE

FREDERICK ALBERT TAYLOR AND HENRY ALFRED TAYLOR, OF KIRTON, NEAR BOSTON, ENGLAND

TEMPERATURE-REGULATING APPARATUS

Application filed March 25, 1929, Serial No. 349,752, and in Great Britain March 22, 1928.

This invention comprises improvements in temperature regulating apparatus and has particular although not exclusive reference to apparatus for the protection of horticultural and agricultural crops, trees or plants against the effects of frosts or low temperatures the main object of the invention being to provide heat diffusing apparatus adapted to be brought into effect automatically when the temperature of the atmosphere in the vicinity of said crops falls to a predetermined degree.

Broadly the invention comprises, in combination a heating device, means for lighting or firing said heating device and thermostatic means functioning automatically at a predetermined temperature to bring into operation said firing means and cause the said heating device to be lighted.

Means are also advantageously installed for enabling the apparatus to be adjusted so that same may be caused to operate at different degrees of temperature.

The apparatus may also be arranged to fire from a single thermostat a plurality of heating devices either simultaneously, successively or in relays.

The firing of the plurality of heating devices from a single thermostat may be effected individually or in groups or relays at predetermined intervals through delay clockwork mechanism electrically controlled from the said thermostat.

For the purpose of more fully describing the nature of this invention, reference will now be made to the accompanying drawings wherein:—

Fig. 1 illustrates in side elevation a combined thermostat and electrical contact device provided in accordance with this invention and a method of applying same to a heat diffusing device.

Fig. 2 is a fragmental plan view of part of Fig. 1 showing the electrical connections thereto.

Fig. 3 is a sectional side elevation illustrating means embodying a pyrotechnic fuse, for enabling the apparatus to fire a heating device.

Figure 4:
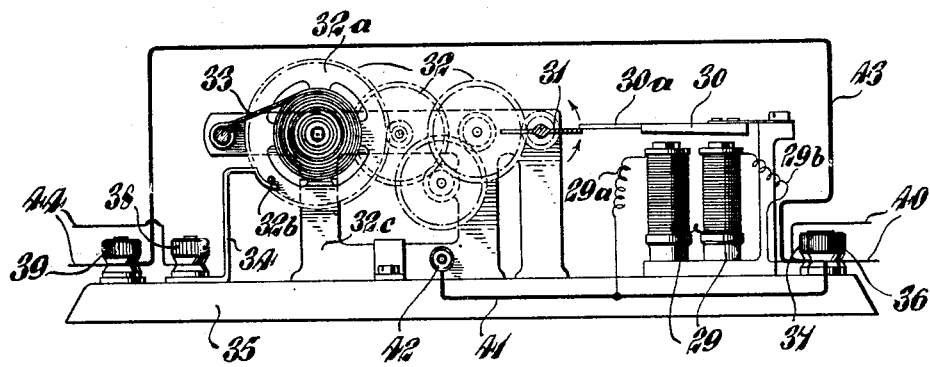
Fig. 4 is a side elevation of an electrically controlled clockwork delay mechanism for use in conjunction with the thermostat and electrical contact device, the electrical leads thereof being shown diagrammatically.

In one method of carrying out the invention the apparatus embodies a thermostatic device, i. e. a device operable by changes of temperature, said device conveniently comprising two strip metal elements 1, having different properties or coefficients spaced apart at one extremity of the device by means of the spacing piece 2 and connected together at the opposite extremity by means of the screwed pin 3, the members 1 being adapted to react by relative contraction and deflection to temperature variations and operate to give a definite and predetermined movement.

With this thermostatic device is connected suitable lever mechanism 4, 5 and 6, arranged to exaggerate the movement produced in said device, the magnified motion of the lever 6, being adapted to cause same to make contact with an electrical contact screw 7. The contact screw 7 is, preferably, adjustable and provided with a vernier temperature scale 8, the screw 7 being then adapted to be adjusted to cause the device to operate only at a predetermined temperature.

This contact or switch device is placed in the circuit of an electric battery 9, such as the customary dry battery employed in flash lamps, and the arrangement is such that when the thermostatic device has been caused by low temperature to deflect upwardly at the extremity thereof at which the elements 1 are connected, to a degree sufficient to operate or close the electric switch or contacts 6, 7, the battery circuit is completed and a common firework or other fuse 10 or a spark-fired petrol lighter is fired and continues to fire for a given period.

Where a fuse is employed same may, conveniently, be accommodated immediately above a receptacle 11 supported by an upstanding bracket 12 rising from the supporting bar 18, the said fuse in one arrangement being supported in suitable clips 13 from a horizontal arm 11$^a$ of said bracket and connected by suitable leads 14 to terminals 15 and 16, positioned on an insulating block 17 mounted upon the main supporting bar 18 of the device, which may be of metal.

A convenient type of fuse, illustrated in detail in Fig. 3, comprises an outer cartridge casing 19 of compressed paper or other suitable material accommodating a quantity of highly combustible substance or material 20 and having centrally positioned therein at one extremity thereof a smaller fusible cartridge comprising a shell 21 of tinfoil also conveniently accommodating a small supply of the combustible material 20 and terminating in a cap or like element 22 composed of brimstone or other suitable igniting medium.

The leads 14 to the fuse are connected to the inner tinfoil cartridge 21 and upon the thermostat operating to close the electrical circuit the current from the battery 9 in passing through the said cartridge 21 heats same to a degree sufficient to cause it to ignite the brimstone cap 22 and fire the fuse.

Immediately below the fuse 10 and also supported by the clips 13 is a cotton wound rod 23 or other suitable member adapted to catch fire and burn for a considerable period upon the fuse being ignited and to light a quantity of light volatile oil provided in the container 11, such light oil being adapted to effect the firing of a heavier oil provided in a larger open container 24 constituting a heat diffusing device, through the medium of a suitable wick 25 communicating with both of said containers. The wick 25 is adapted to burn until the heavy surface oil in contact therewith is sufficiently vapourized to become ignited.

A shield 26 is conveniently supported from and slidably adjustable on the vertical portion of the bracket 12 and functions to protect the fuse 10 and light oil in the container 11 from rain, and a second shield 27 supported by screws or the like 28 that unite it to the bar 18, is provided to afford similar protection for the battery 9 and the thermostat and contact device.

The thermostat and contact device may be supported in position on the container 24 of the heat diffusing device by hooking the suitably bent portion 12$^a$ of the bracket 12 over the upper edge of said container.

It will be seen that the parts which have been described are associated into a unit that may be easily applied to a container 24 for the fuel oil employed for heating, in the manner which has been described. The said unit comprises two parts, first a part comprising a thermostatic device and the battery or source of electric energy and the mechanical connections by which the circuit from the battery is controlled through the thermostat, these parts being conveniently arranged relative to a main supporting plate 18, the thermostat bars being preferably located below the supporting plate and disposed lengthwise thereof, while the lever arrangement that effects the opening and closing of the electric circuit is located above the plate and also disposed lengthwise thereof; and these parts with the battery are protected by a shield 27. The second part of the said unit includes the igniting devices for the main body of fuel and these are protected by an individual shield 26.

It is to be understood that the type of heating device lighted by the fuse may be varied to suit existing requirements and, if desired, a plurality or series of such devices can be arranged to be simultaneously or sequentially lighted by the operation of one and the same temperature-controlled device.

Means for effecting the subsequent operations of one or more further heating devices from the single thermostat 1, are illustrated in Figure 4, and comprise an electromagnet 29 adapted, upon the arm 6 making contact with the adjustable contact screw 7 and firing the initial heating device, to attract an armature 30 provided with an extending arm 30$^a$, which normally engages with and holds from motion a rotatable member 31 having one or more radially extending arms or vanes. When freed by the attraction of armature 30, the member 31 is rotated through clockwork mechanism embodying a train of gear wheels 32 and a coiled spring 33, but upon the arm 30$^a$ engaging with the said member 31 the clockwork mechanism is withheld from operation.

The first gear wheel 32$^a$, mounted upon the same spindle as the spring 33 rotates very slowly when the clockwork mechanism is in operation and such wheel is adapted to carry one or more projecting contact pins 32$^b$ adapted to engage with a contact strip 34 supported from the base 35 of the device.

Suitable terminals 36, 37, 38 and 39 are provided on the base 35 and the electrical connections are as follows:

Leads 40, see Fig. 2, are taken from the terminals 15 and 16 and secured to the terminals 36 and 37. A lead 41 is then secured to the terminal 36 and led to a terminal 42 on one of the upstanding brackets 32$^c$ supporting the clockwork mechanism. One side 29$^a$ of the coiled winding of the electromagnet is then connected to the lead 41 and the other side 29$^b$ of the said winding is connected to the terminal 37. A lead 43 extends between the terminal 37 and the terminal 39 and the electrical connections of the device are completed by a pair of leads 44 from the terminals 38 and 39 adapted to be connected to a further fuse device in a similar manner to the leads 14, (Figure 1).

In operation, upon the thermostat 1 causing the arm 6 to make contact with the screw 7 to fire the fuse 10 and the initial heating device, the circuit of the electromagnet 29 is simultaneously closed and the said magnet is caused to attract the armature 30 and bring the arm 30ª thereof out of engagement with the rotating member 31 to release the clockwork mechanism, such mechanism continuing to operate while the arm 6 is in contact with the screw 7 and the circuit of the electromagnet is closed.

Thus, in the event of the one heating device being insufficient to counteract excessive low temperature which continues to cause the thermostat to hold the the arm 6 into engagement with the contact screw 7, the clockwork mechanism will continue to rotate and eventually the contact pin 32ᵇ on the slowly rotating gear wheel 32ª will make contact with the strip 34 and close the circuit of the leads 44 and fire a further fuse and heating device.

If desired, further circuits each embodying a fuse and controlling an additional heating device may be closed in sequence or in a predetermined order and at predetermined intervals by causing a moving contact pin or member such as 32ᵇ to coact with further contact elements or strips associated with said additional circuits and heating devices.

Should, however, the firing of the initial heating device 24 be sufficient to counteract the low temperature, the thermostat will operate to withdraw the arm 6 from the contact stud 7 and the arm 30 and its extending arm 30ª will be released to withhold the clockwork mechanism from further rotation, but will again be brought into operation upon subsequent low temperature causing the thermostat again to complete the circuit by raising the arm 6.

The firing arrangement that has been described as consisting of an electrically ignited cartridge, while the preferred form of igniting device, is not the only form of igniter that is practicable and, therefore, the showing and description of this feature herein is to be considered typical and not as limiting the invention to the specific form shown.

In a modification a small quantity of lighter and comparatively quickly burning oil may be poured on to the surface of the heavier oil in the container 24 as represented by 50, Fig. 3, the lighter oil providing the initial ignition.

The oil vessels 24 or other heating devices may be provided with shields or other suitable means, or are so located, that the flames and smoke therefrom do not detrimentally affect the trees, plants or crops that are being protected by the heated atmosphere.

It will also be appreciated that in addition to protecting trees, plants or crops and the like in the open, the invention may readily be adapted for use in regulating the temperature of buildings such as glass houses, or the like wherein delicate plants, flowers and the like are being reared or stored and may also be used in controlling the heating of garages, store houses and the like.

The mechanism represented in Fig. 4, whereby a second heater is adapted to be brought into operation if the first be ignited and is not sufficient for the purposes desired, is particularly adapted for use within a building where the heat from the burning fuel within a single, or several containers 24 is conserved and, therefore, may readily affect the thermostatic device.

Claims:

1. Temperature regulating apparatus comprising, in combination, a heating device, an electrical circuit adapted to fire said heating device, thermostatic means functioning automatically at a predetermined temperature to complete said electrical circuit, a supplementary electrical circuit and a supplementary delayed action contact device adapted to be controlled from the thermostatic means and to function in conjunction with said thermostat to control said supplementary electrical circuit, the supplemental circuit being arranged to have included in it a supplementary heating device.

2. Apparatus comprising, in combination, a heating device, an electrical circuit for firing said heating device, a thermostatic device functioning automatically at a predetermined temperature to complete said electrical circuit, a supplementary electrical circuit adapted to be connected with a supplementary heating device, a delay action clockwork contact mechanism, electro-magnetic means controlling said clockwork mechanism, and said electro-magnetic means being controlled from the thermostat device so as to cause the contact mechanism to complete the said supplementary electrical circuit after running a determined period to cause firing of the said supplementary heating device.

3. A portable igniting unit for a heater used in protecting crops and for other purposes, comprising an electrically operating igniter, constituting one part of the unit, a thermostatic device, and controller for an electric circuit operated from the thermostatic device, these constituting a second part of the unit, an electric circuit including a generator and the igniter and a frame by which the parts of the unit are supported, so constructed that when the unit is in place for use the igniter is adjacent to the body of fuel to be ignited and the thermostatic device and the circuit controller are at a distance therefrom so as not to be subjected to the direct heat of the burning fuel of the heater.

4. A portable igniting unit for a heater used in protecting crops and for other purposes, comprising an electrically operated igniter and a container for a relatively small body of easily ignitible fuel constituting one part of the unit, and an electric generator, a thermostatic device and a controller for the circuit in which are the generator and igniter operated by the thermostatic device, the latter group of parts constituting a second part of the unit, and a frame by which the said two parts of the unit are supported at relatively wide distance apart.

5. The portable igniting unit described in claim 4 including a protecting cover for each of the said parts of the igniting unit.

6. The igniting unit described in claim 4 characterized by the supporting frame being shaped for ready attachment to the container for the fuel of the heater, with the igniting feature thereof located in close proximity to the body of fuel in the heater to be ignited and the thermostatically controlled circuit closing features located outside the container for the body of fuel at a relatively great distance from the igniting feature.

7. A portable igniting unit for a heater used in protecting crops and for other purposes, comprising an electrically operated igniter and a container for a relatively small body of easily ignited fuel constituting one part of the unit and an electric generator, a thermostatic device and a controller for the electric circuit in which are the generator and the igniter constituting a second part of the unit, a plate by which the generator, the thermostatic device and the circuit controller are supported and a bracket rising from the said plate and carrying the igniting portion of the unit, the bracket being formed into a hook-like portion adapted to engage with the edge of the heater to which the unit may be applied.

8. A heater for use in protecting crops, comprising an open top container for a body of fuel, a supporting frame consisting of an upstanding bracket provided at its upper end with a hook adapted to engage with the upper edge of the fuel container and having a projecting portion extending inwardly over the body of fuel that may be in the container, and a horizontal plate secured to the lower end of the bracket extending outwardly away from the fuel container, an electrically operated igniter carried by the inwardly extending upper portion of the bracket, a generator carried by the outwardly extending plate of the supporting frame, a thermostatic device arranged below the plate and carried thereby, a circuit closer supported by the plate on its upper side, a lever arrangement operated by the thermostatic device for moving the circuit controller, and an electric circuit including the generator, the igniter and the circuit controller.

FREDERICK ALBERT TAYLOR.
HENRY ALFRED TAYLOR.